US009630229B2

(12) United States Patent
Hirata et al.

(10) Patent No.: US 9,630,229 B2
(45) Date of Patent: Apr. 25, 2017

(54) DEVICE FOR MOLDING AND METHOD FOR MOLDING METAL PLATE

(71) Applicant: TOYOTA BOSHOKU KABUSHIKI KAISHA, Aichi-ken (JP)

(72) Inventors: Kazuyuki Hirata, Toyota (JP); Takuma Watanabe, Anjo (JP); Hidekazu Sahara, Toyota (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 120 days.

(21) Appl. No.: 14/443,568

(22) PCT Filed: Apr. 24, 2014

(86) PCT No.: PCT/JP2014/061591
§ 371 (c)(1),
(2) Date: May 18, 2015

(87) PCT Pub. No.: WO2014/175389
PCT Pub. Date: Oct. 30, 2014

(65) Prior Publication Data
US 2015/0290692 A1 Oct. 15, 2015

(30) Foreign Application Priority Data
Apr. 24, 2013 (JP) ................. 2013-091434

(51) Int. Cl.
*B21D 13/02* (2006.01)
*B21K 23/00* (2006.01)
(Continued)

(52) U.S. Cl.
CPC .............. *B21D 13/02* (2013.01); *B21K 23/00* (2013.01); *H01M 8/0206* (2013.01); *B21D 11/085* (2013.01)

(58) Field of Classification Search
CPC ........ B21D 5/16; B21D 11/08; B21D 11/085; B21D 13/10; B21D 22/206; B21D 37/10;
(Continued)

(56) References Cited

U.S. PATENT DOCUMENTS 1,145,208 A 8/1922 Milner
1,425,208 A 8/1922 Milner
(Continued)

FOREIGN PATENT DOCUMENTS

CH 358773 12/1961
CN 1387964 1/2003
(Continued)

OTHER PUBLICATIONS

Translation of International Preliminary Report on Patentability for PCT/JP2014/061591.
(Continued)

*Primary Examiner* — Peter DungBa Vo
*Assistant Examiner* — Joshua D Anderson
(74) *Attorney, Agent, or Firm* — Greenblum & Bernstein, P.L.C.

(57) ABSTRACT

A protruding portion is formed in a metal plate material by use of a plurality of molding tools each of which has a die and a punch. In a first step, an initial protruding portion is formed in the metal plate material by use of a first molding tool. In this step, a top of the initial protruding portion is formed to be thinner than other parts. In a second step, a sidewall of the initial protruding portion is rolled out by use of a second molding tool, and the protruding portion is formed.

16 Claims, 9 Drawing Sheets

(51) Int. Cl.
*H01M 8/0206* (2016.01)
*B21D 11/08* (2006.01)

(58) Field of Classification Search
CPC ........ B21D 53/04; B21D 13/02; B21D 13/08; B21D 22/02; B21D 37/08; B23K 23/00; H01M 8/254
USPC ... 72/349, 352, 377, 379.2, 379.6, 384, 385, 72/400, 404, 469, 472
See application file for complete search history.

(56) References Cited

U.S. PATENT DOCUMENTS

| | | | |
|---|---|---|---|
| 3,194,047 | A | 7/1965 | Eggert, Jr. et al. |
| 8,720,247 | B2 * | 5/2014 | Otsubo .................. B21D 13/02 72/379.6 |
| 8,828,622 | B2 * | 9/2014 | Fujimura .............. H01M 8/026 429/512 |
| 2002/0074867 | A1 | 6/2002 | Matsuura et al. |
| 2002/0112811 | A1 | 8/2002 | Beauvois et al. |
| 2003/0110824 | A1 | 6/2003 | Miyahara |
| 2007/0029073 | A1 | 2/2007 | Teshima et al. |
| 2012/0282482 | A1 | 11/2012 | Flehmig et al. |

FOREIGN PATENT DOCUMENTS

| | | |
|---|---|---|
| CN | 1424717 | 6/2003 |
| CN | 201291258 | 8/2009 |
| CN | 102997741 | 3/2013 |
| DE | 459970 | 5/1928 |
| JP | 53-8354 | 1/1978 |
| JP | 63-194823 | 8/1988 |
| JP | 2-52125 | 2/1990 |
| JP | 07-001044 | 1/1995 |
| JP | 2000-317531 | 11/2000 |
| JP | 2001-321838 | 11/2001 |
| JP | 2002-313354 | 10/2002 |
| JP | 2003-61317 | 2/2003 |
| JP | 2003-161317 | 6/2003 |
| JP | 2005-243252 | 9/2005 |
| JP | 2007-98413 | 4/2007 |
| JP | 2007-167886 | 7/2007 |
| JP | 2010-167441 | 8/2010 |
| JP | 2012-51016 | 3/2012 |
| JP | 2013-59805 | 4/2013 |
| WO | 2011/083008 | 7/2011 |

OTHER PUBLICATIONS

Chinese Office Action for CN App. No. 201480003152.5 issued on Feb. 1, 2016, along with English-language translation thereof.
Chinese Office Action for CN App. No. 201480021914.4 dated Jun. 1, 2016, along with English-language translation thereof.
Japanese Office Action for JP App. No. 2013-091434 dated Jul. 12, 2016, along with English-language translation thereof.
Japanese Office Action for JP App. No. 2013-091506 mailed on Jul. 26, 2016, along with English-language translation thereof.
Extended European Search Report in EP Appl. No. 14 78 8214.6 dated Nov. 4, 2016.

* cited by examiner

DEVICE FOR MOLDING AND METHOD FOR MOLDING METAL PLATE

FIELD OF THE INVENTION

The present invention relates to a method for and a device for molding a metal plate material in which the metal plate material is molded to have a protruding portion by means of a molding tool having a die and a punch.

BACKGROUND OF THE INVENTION

Conventionally, a fuel cell separator has been known in which flow passages through which a gas, such as hydrogen or oxygen, or cooling water flows are formed by forming a plurality of protruding portions in a metal plate material. For example, methods disclosed by Patent Document 1 and Patent Document 2 have been proposed as methods for molding this fuel cell separator.

According to the molding method of Patent Document 1, as shown in FIG. 15(a), a small projection 421 is formed in a metal plate material 42 by means of a mold 411 and a mold 412 of a first molding tool 41. Thereafter, as shown in FIG. 15(b) and FIG. 15(c), the inside of the peripheral edge of the small projection 421 is pressed by a mold 431 and a mold 432 of a second molding tool 43, and a protruding portion 422 is formed.

According to the molding method of Patent Document 2, as shown in FIG. 16(a), a metal plate material 52 is pressed by a forward end surface of a convex part of a mold 511 of a first molding tool 51, and a small projection 521 is formed. Thereafter, as shown in FIG. 16(b), an oblique surface of a mold 512 and an oblique surface of the mold 511 of the first molding tool 51 are allowed to roll out (i.e., extend by applying pressure) sidewalls of the small projection 521 between both the oblique surfaces, and a protruding portion 522 is formed. Furthermore, as shown in FIG. 16(c), a forward end surface of a mold 531 and a bottom surface of a mold 532 of a second molding tool 53 that differs from the first molding tool 51 are allowed to roll out a top 524 of the protruding portion 522 between the forward end surface and the bottom surface. As a result, the top 524 of the protruding portion 522 becomes thinner, and the width of the top 524 becomes greater.

The following problems have resided in the conventional molding methods.

According to the molding method of Patent Document 1, both press working by use of the first molding tool 41 and press working by use of the second molding tool 43 are chiefly drawing-out molding. In detail, as shown in FIG. 15(a), the metal plate material 42 is pressed by a convex part 413 of the mold 412, and is drawn out. Thereafter, as shown in FIG. 15(b), the peripheral edge of the small projection 421 of the metal plate material 42 is pressed by a corner part 434 of the mold 432 and by a corner part 433 of the mold 431 in a narrow region. In this case, the position of the corner part 433 and that of the corner part 434 deviate in a height direction of the protruding portion of the metal plate material 42. Therefore, the metal plate material 42 is not only drawn out by both corner parts 433 and 434 but also bent on the corner parts 433 and 434 each of which serves as a fulcrum.

Thereafter, as shown in FIG. 15(c), the top of the small projection 421 of the metal plate material 42 is flattened by the mold 432 and the mold 431 between both the molds 431 and 432. On the other hand, pressing by means of the corner part 433 of the mold 431 is maintained in the narrow region.

As described above, the metal plate material 42 is drawn out by the mold 412, and is then drawn out by both the corner parts 433 and 434, and is drawn out by the corner part 433.

Therefore, the metal plate material 21 is drawn out, and reaches a state of being easily broken. Moreover, the metal plate material 21 is continuously pressed locally. Therefore, the stress distribution on the metal plate material 21 becomes non-uniform. In other words, the metal plate material 21 is continuously pressed near the corner part 433, and hence reaches a state of being easily broken.

According to the molding method of Patent Document 2, as shown in FIG. 16(a) and FIG. 16(b), the small projection 521 is formed by the mold 51, and then the sidewall 523 of the small projection 521 is rolled out by the first molding tool 51, and the protruding portion 522 is formed. In this case, as is apparent from FIG. 16(b), the sidewall 522 is formed by thinning only the protruding portion 523, and therefore the thickness of the sidewall 523 becomes insufficient. In this state, the strength distribution on the metal plate material 52 becomes non-uniform, and therefore the metal plate material 52 reaches a state of being easily broken. Additionally, according to the molding method of Patent Document 2, the protruding portion 522 is formed by the first molding tool 51, and then the top 524 of the protruding portion 522 is rolled out by the second molding tool 53, and the width of the top 524 becomes greater as shown in FIG. 16(c). In other words, the width of the top 524 is expanded by the movement of the material resulting from the roll-out of the top 524. The material that has moved in this way is gathered at the corner part of the top 524. Even in this state, the sidewall 523 remains thin, and is still in the state of being easily broken. Moreover, when the material gathers at the corner parts of both ends of the top 524, the stress distribution between the top 524 and the sidewall 523 greatly changes. Therefore, deformations, such as warpage or undulation, easily occur in the metal plate material 52 that has been molded.

As described above, according to the molding methods of Patent Documents 1 and 2, the fear of being broken or deformed is high, and therefore it is difficult to greatly extend the metal plate material 52 or to heighten the protruding portion 522. It is also conceivable that deformations are removed by leveling the stress distribution of the metal plate material 52. Therefore, there is a case in which annealing is applied after completing a molding operation. However, in this case, the processing step becomes complex.

PRIOR ART DOCUMENTS

Patent Documents

Patent Document 1: Japanese Published Patent Application No. 2000-317531

Patent Document 2: Japanese Published Patent Application No. 2012-51016

SUMMARY OF THE INVENTION

An object of the present invention is to provide a method for and a device for molding a metal plate material capable of forming a protruding portion having an adequate height with a uniform thickness in a metal plate material and capable of preventing the metal plate material from being broken.

To solve the aforementioned problems, according to a first aspect of the present invention, a method for molding a protruding portion in a metal plate material by a molding tool having a die and a punch is provided. This method includes a first step of molding the protruding portion in the metal plate material by drawing-out molding that uses a first molding tool in which the protruding portion is molded so that a top of the protruding portion is made thinner than other parts, a second step of rolling out sidewalls of the protruding portion by use of a second molding tool in which the protruding portion is molded to have a pitch narrower than the protruding portion formed in the first step and a third step of shaping the sidewall of the protruding portion to erect the sidewall by use of a third molding tool. An arrangement pitch of concave portions and convex portions of a die and of a punch of the third molding tool is wider than an arrangement pitch of concave portions and convex portions of a die and of a punch of the second molding tool and is narrower than an arrangement pitch of concave portions and convex portions of a die and of a punch of the first molding tool.

To solve the aforementioned problems, according to a second aspect of the present invention, a device for molding a protruding portion in a metal plate material by use of a molding tool having a die and a punch is provided. The molding tool includes a first molding tool, a second molding tool and a third molding tool, and the first molding tool has a die and a punch, both of which mold the protruding portion in the metal plate material, and the die and the punch of the first molding tool mold the protruding portion so that a top of the protruding portion becomes thinner than other parts, the second molding tool has a die and a punch, both of which roll out sidewalls of the protruding portion, and the third molding tool has a die and a punch, both of which shape the sidewall of the protruding portion to erect the sidewall. An arrangement pitch of concave portions and of convex portions of the die and of the punch of the second molding tool is narrower than an arrangement pitch of concave portions and of convex portions of the die and of the punch of the first molding tool. Further, an arrangement pitch of concave portions and convex portions of a die and of a punch of the third molding tool is wider than an arrangement pitch of concave portions and convex portions of the die and of the punch of the second molding tool and is narrower than an arrangement pitch of concave portions and convex portions of the die and of the punch of the first molding tool.

According to the present invention, in the first step, the metal plate material is drawn out by use of the first molding tool so that the top of the protruding portion becomes thinner than other parts. At this time, the material of the top of the protruding portion moves to the sidewall. In the second step, the sidewall of the protruding portion is rolled out by use of the second molding tool. At this time, the material of the sidewall moves to the top of the protruding portion. In other words, drawing-out molding is performed in the first step, and, after that, rolling-out molding is performed. As a result, when a protruding portion having an adequate height is molded, it is possible to prevent the material from being broken, and is possible to effectively use the material of the sidewall. Additionally, in the first and second steps, the material moves to each other between the top and the sidewall of the protruding portion, and therefore it is possible to make the protruding portion to have a uniform thickness. Therefore, the strength distribution and the stress distribution of a molded article are excellently balanced, and the breaking strength is improved. In the second step, the protruding portion is molded to have a pitch narrower than the protruding portion formed in the first step. In other words, the arrangement pitch of the concave portions and the convex portions of the die and of the punch of the second molding tool is narrower than the arrangement pitch of the concave portions and the convex portions of the die and of the punch of the first molding tool. This makes it possible to correct the extension along the perimeter of the material by rolling out the sidewall in the second step. As a result, it is possible to restrain the warpage or undulation of a molded article. Further, in the third step, the sidewall of the protruding portion is shaped to be erected almost without being rolled out by means of the die and the punch. Therefore, the material of the protruding portion does not greatly extend along the perimeter. Therefore, it is possible to allow the final arrangement pitch of the protruding portion to approximate the arrangement pitch of the first molding tool by setting the arrangement pitch of the third molding tool at a value between the arrangement pitch of the second molding tool and the arrangement pitch of the first molding tool.

DETAILED DESCRIPTION OF THE PREFERRED EMBODIMENTS

First Embodiment

Referring to FIG. 1 to FIG. 9, a description will be hereinafter given of a first embodiment in which a method for molding a metal plate material according to the present invention is employed to manufacture fuel cell separators.

Figure 1:
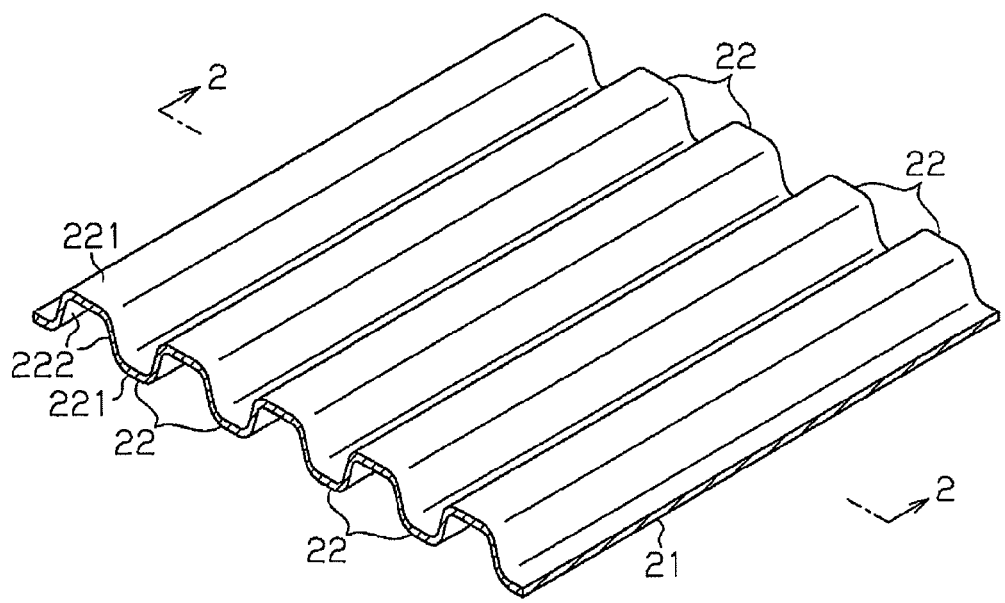
FIG. 1 is a perspective view showing a molded article that has been molded by a method for molding a metal plate material according to a first embodiment of the present invention.
Figure 2:
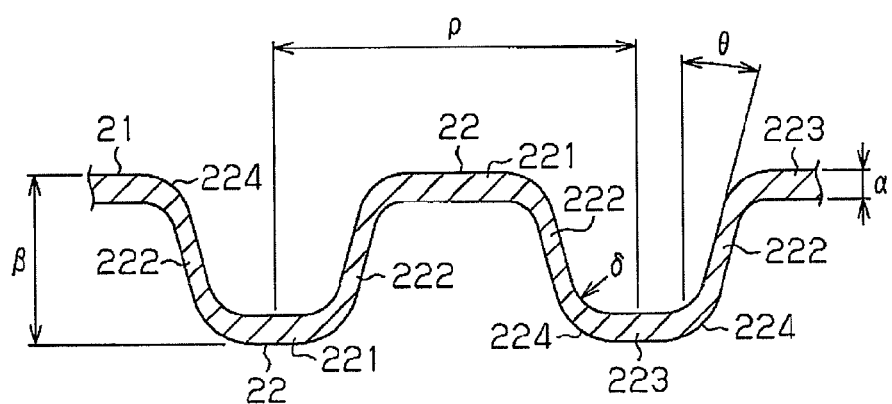
FIG. 2 is a partial cross-sectional view along line 2-2 of FIG. 1.

As shown in FIG. 1 and FIG. 2, a plurality of protruding portions 22 are formed on both sides of a metal plate material 21 that is made into a fuel cell separator. The protruding portions 22 are molded to be evenly spaced in a pleated shape. A material excellent in corrosion resistance, such as titanium, titanium alloys, or stainless steel, is used as the metal plate material 21. In this embodiment, titanium is used.

Figure 3:
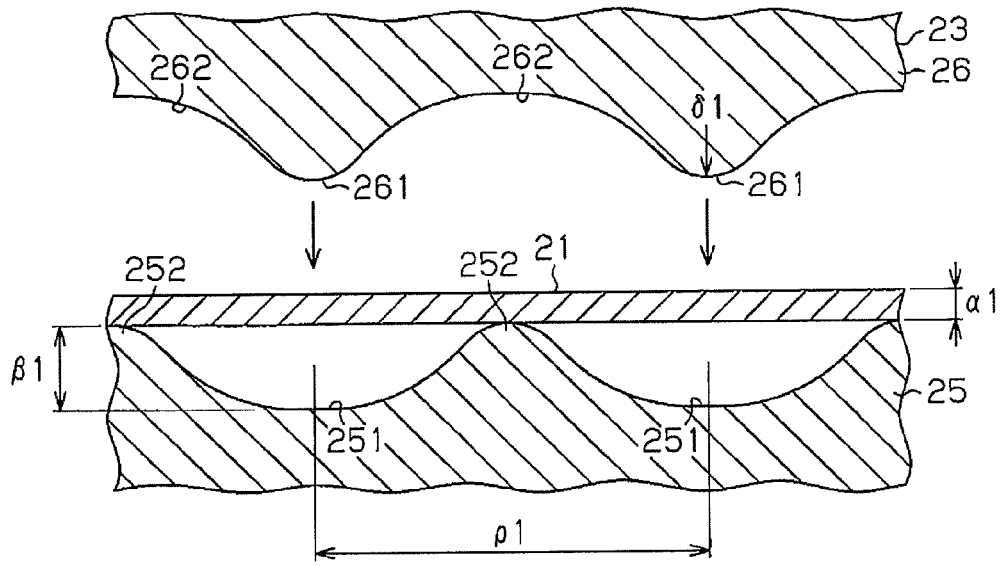
FIG. 3 is a partial cross-sectional view showing a first step of the molding method of the first embodiment.

As shown in FIG. 3, the thickness a1 of the flat metal plate material 21 that has not yet been molded is uniform as a whole. The thickness a1 falls within the range of from 0.06 to 0.20 mm, and, in this embodiment, it is 0.10 mm. As shown in FIG. 2, the thickness a of the metal plate material 21 that has been molded is uniform as a whole. The thickness a falls within the range of from 0.04 to 0.18 mm, and, in this embodiment, it is 0.08 mm. The arrangement pitch ρ of the protruding portion 22 falls within the range of from 0.50 to 2.00 mm, and, in this embodiment, it is 1.30 mm. The height β between the bottom surface and the top surface of the protruding portion 22 falls within the range of from 0.40 to 0.80 mm, and, in this embodiment, it is 0.60 mm.

As shown in FIG. 2, each protruding portion 22 is composed of a top 221 and sidewalls 222 that are inclined at both sides of the top 221. The cross section of the protruding portion 22 is substantially trapezoidal. Each protruding portion 22 has an upside-down shape with respect to the other adjoining protruding portion 22. In the protruding portion 22 facing downwardly, the top 221 is a bottom. This bottom is hereinafter described as the top 221. The top 221 is composed of a flat part 223 disposed at the center in a width direction and bent parts 224 disposed at both ends in the width direction. The bent part 224 extends along a circular arc. The curvature radius δ on the inner surface side of the bent part 224 falls within the range of from 0.08 to 0.15 mm, and, in this embodiment, it is 0.10 mm. The angle θ of the sidewall 222 with respect to the flat part 223 falls within the range of from 10 to 30 degrees, and, in this embodiment, it is 15 degrees.

Figure 5:
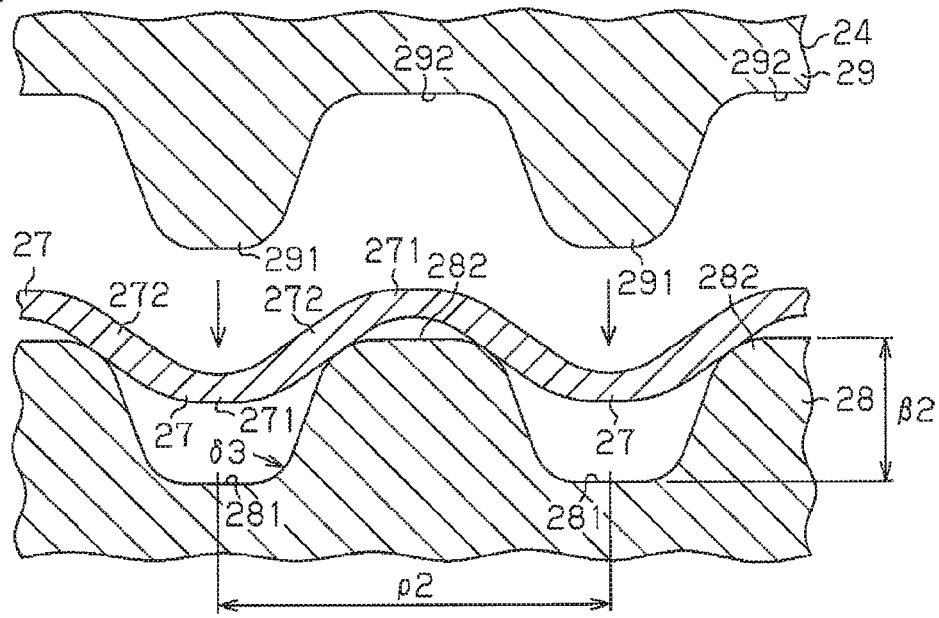
FIG. 5 is a partial cross-sectional view showing a second step of the molding method of the first embodiment.
Figure 7:
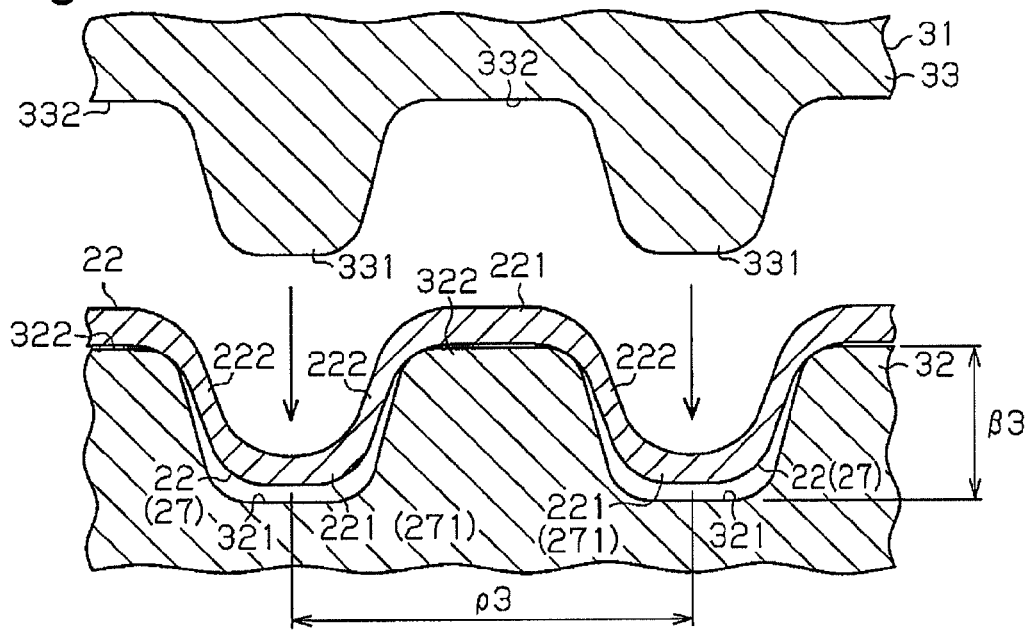
FIG. 7 is a partial cross-sectional view showing a third step of the molding method of the first embodiment.
Figure 9:
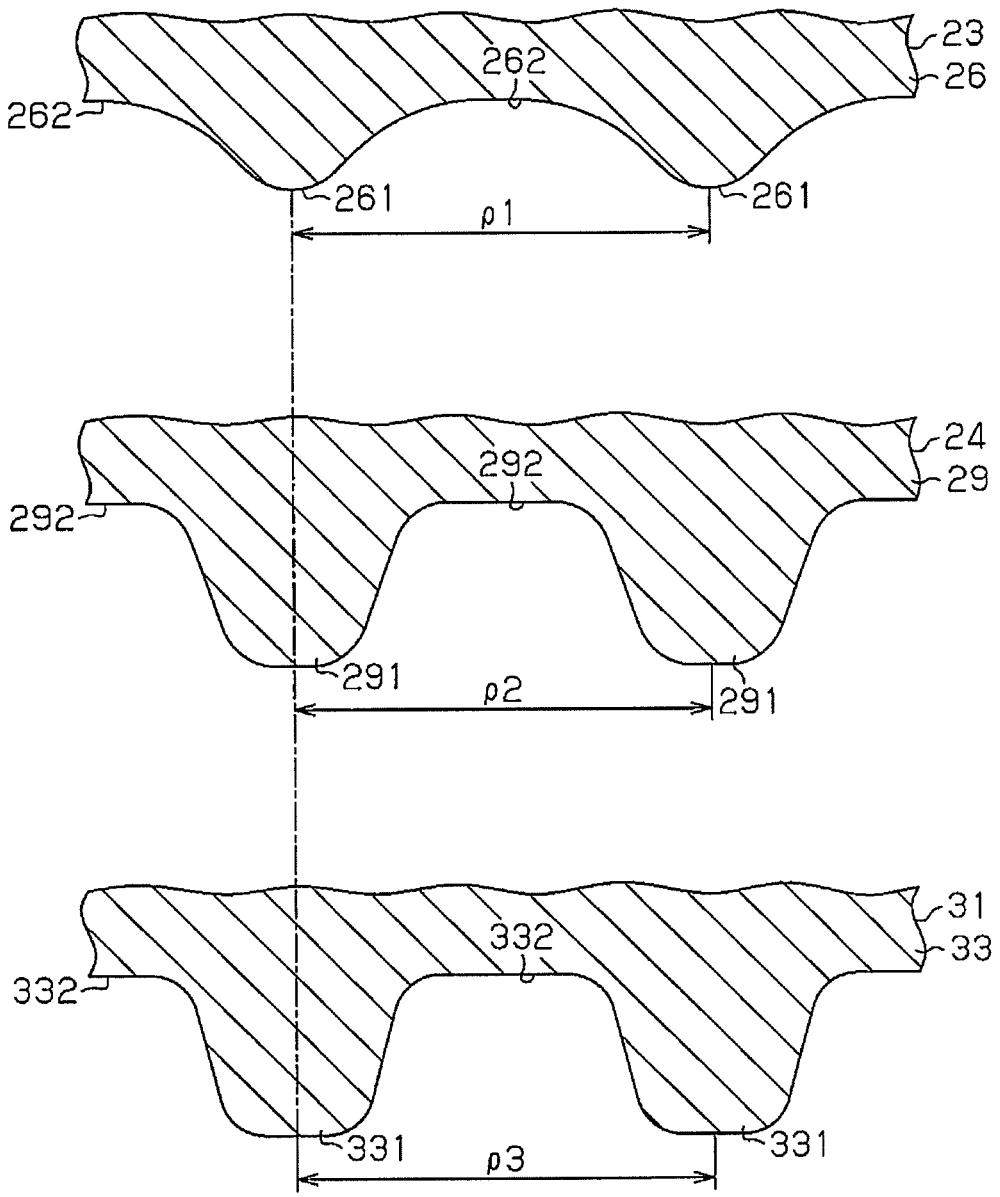
FIG. 9 is a partial cross-sectional view showing a punch of a molding tool in the first to third steps of the molding method of the first embodiment.

The molding of the protruding portion 22 with respect to the metal plate material 21 is performed in a first step that uses the first molding tool 23 shown in FIG. 3 and FIG. 9, a second step that uses the second molding tool 24 shown in FIG. 5 and FIG. 9, and a third step that uses the third molding tool 31 shown in FIG. 7 and FIG. 9.

As shown in FIG. 3, the first molding tool 23 used in the first step is composed of a die 25 and a punch 26 capable of coming into contact with and of being separated from the die 25. A concave portion 251 and a convex portion 252 are alternately formed on the upper surface of the die 25 to be evenly spaced out. A convex portion 261 and a concave portion 262 are alternately formed on the lower surface of the punch 26 to be evenly spaced out. The convex portion 261 and the concave portion 262 are disposed to correspond to the concave portion 251 and the convex portion 252, respectively.

As shown in FIG. 3 and FIG. 9, the arrangement pitch ρ1 of the concave portion 251 and the convex portion 252 or of the convex portion 261 and the concave portion 262 is slightly narrower than the arrangement pitch ρ of the protruding portions 22. The depth of the concave portion 251 or 262, i.e., the height β1 of the convex portion 252 or of the convex portion 261 is smaller than a value obtained by subtracting the thickness of the metal plate material 21 from the height β of the protruding portion 22 shown in FIG. 2.

The forward end of the convex portion 252 or 261 is formed in a circular-arc shape in cross section. The cross section of the concave portion 251 and that of the concave portion 262 are ellipsoidal.

As shown in FIG. 5, the second molding tool 24 used in the second step is composed of a die 28 and a punch 29 capable of coming into contact with and of being separated from the die 28. A concave portion 281 and a convex portion 282 are alternately formed on the upper surface of the die 28 to be evenly spaced out. A convex portion 291 and a concave portion 292 are alternately formed on the lower surface of the punch 29 to be evenly spaced out. The concave portion 281, the convex portion 282, the convex portion 291, and the concave portion 292 are each trapezoidal in cross section. The convex portion 291 and the concave portion 292 are disposed to correspond to the concave portion 281 and the convex portion 282, respectively. The shape of the concave portion 281 or 292 approximates the shape of the outer surface of the protruding portion 22. The shape of the convex portion 282 or 291 approximates the shape of the inner surface of the protruding portion 22. The curvature radius δ3 at both ends of the concave portion 281 or 292 is slightly smaller than the curvature radius δ at both ends on the outer surface side of the protruding portion 22. The arrangement pitch ρ2 of the concave portion 281 or 292, i.e., the arrangement pitch ρ2 of the convex portion 282 or 291 is slightly narrower than the arrangement pitch ρ1 of the first molding tool 23 shown in FIG. 3.

Figure 6A:
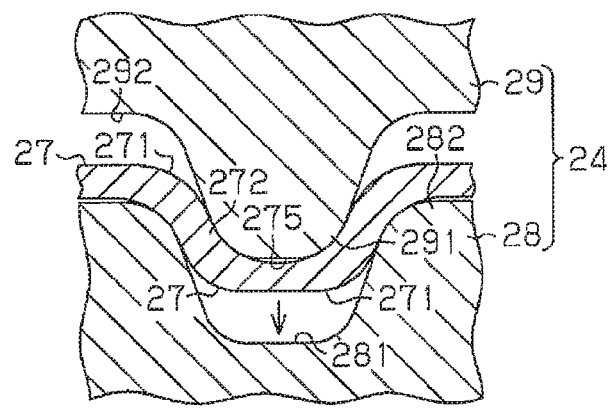
FIGS. 6 (a) and (b) are partial cross-sectional views that sequentially show the molding process of the second step.
Figure 6B:
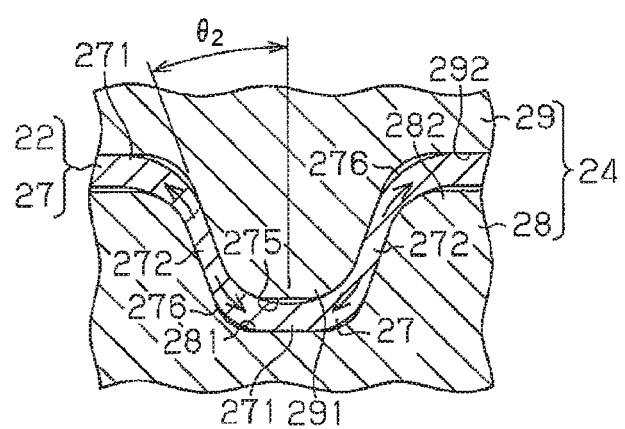
Figure 8A:
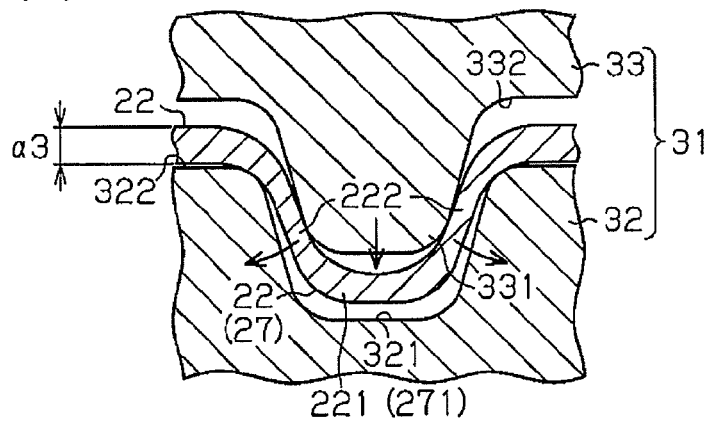
FIGS. 8 (a) and (b) are partial cross-sectional views that sequentially show the molding process of the third step.
Figure 8B:
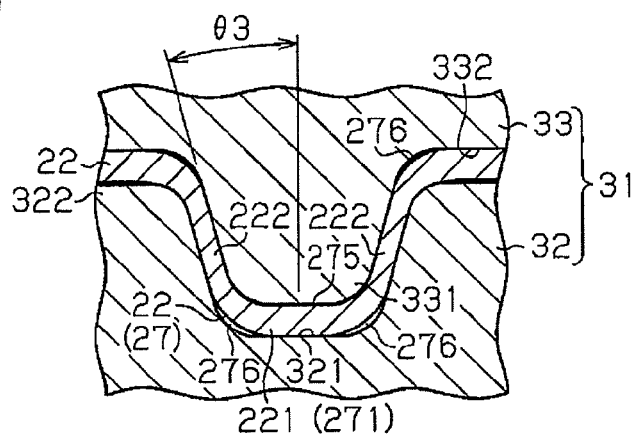

As shown in FIG. 7, the third molding tool 31 used in the third step is composed of a die 32 and a punch 33 capable of coming into contact with and of being separated from the die 32. A concave portion 321 and a convex portion 322 are alternately formed on the upper surface of the die 32 to be evenly spaced out. A convex portion 331 and a concave portion 332 are alternately formed on the lower surface of the punch 33 to be evenly spaced out. The concave portion 321, the convex portion 322, the convex portion 331, and the concave portion 332 are each trapezoidal in cross section. The convex portion 331 and the concave portion 332 are disposed to correspond to the concave portion 321 and the convex portion 322, respectively. The arrangement pitch ρ3 of the concave portion 321 or 332 and that of the convex portion 322 or 331 are slightly wider than the arrangement pitch ρ2 of the second molding tool 24, and are slightly narrower than the arrangement pitch ρ1 of the first molding tool 23. As shown in FIG. 6(b) and FIG. 8(b), the inclination angle θ3 of each side wall surface of the concave portion 321 or 332 and of the convex portion 322 or 331 in the die 32 and the punch 33 of the third molding tool 31 is smaller than the inclination angle θ2 of the second molding tool 24. Other sizes of the third molding tool 31 are substantially the same as those of the second molding tool 24. In the position of the bottom dead center of the punch 33, the gap between the side wall surfaces of the convex portions 322 and 331 of the die 32 and of the punch 33 is slightly narrower than that of the second molding tool 24.

Next, the molding method of this embodiment will be described. First, the first step in this molding method will be described.

Figure 4A:
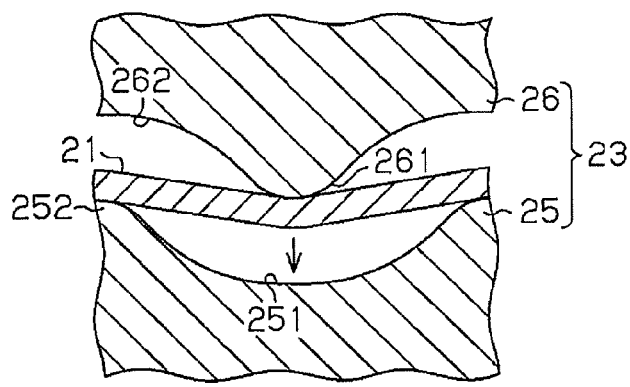
FIGS. 4 (a) and (b) are partial cross-sectional views that sequentially show the molding process of the first step.
Figure 4B:
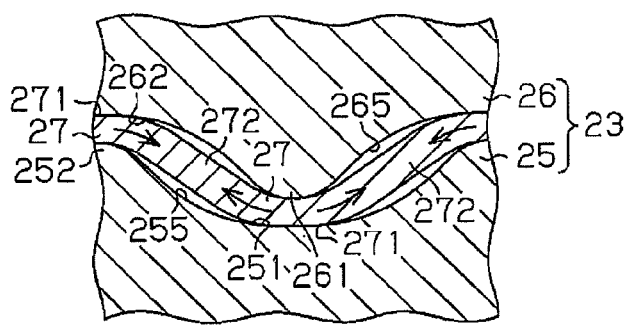

As shown in FIG. 3, in the first step, the metal plate material 21 having a thickness of 0.10 mm is set on the die 25 of the first molding tool 23 in a flat state. When the punch 26 approaches the die 25 in this state as shown in FIG. 4(a) and FIG. 4(b), the back surface and the front surface of the metal plate material 21 are alternately protruded to be spaced with predetermined intervals between the convex and concave portions 261 and 262 of the punch 26 and the concave and convex portions 251 and 252 of the die 25. An initial protruding portion 27 having a waveform shape is molded in this way. When this is molded, the top 271 of the initial protruding portion 27 is pressed by the convex portions 261 and 252 of the punch 26 and of the die 25, and the sidewalls 272 are formed on both sides of the initial protruding portion 27. In the position of the bottom dead center of the punch 26, the inner bottom parts of the concave portions 251 and 262 of the die 25 and of the punch 26 may come into slight contact with the metal plate material 21 to such an extent as not to roll out the metal plate material 21, or may not come into contact with the metal plate material 21.

At this time, as is apparent from FIG. 4(b), the curvature radius of the convex portion 261 or 252 of the first molding tool 23 is smaller than the curvature radius of the concave portion 262 or 251. Therefore, spaces 265 and 255 are defined between the inner surface of the sidewall 272 and the concave portion 262 and between the inner surface of the sidewall 272 and the concave portion 251, respectively. The spaces 255 and 265 are not necessarily required to be formed. The punch 26 and the die 25 may come into contact with the entire surface of the metal plate material 21, and, if so, the punch 26 and the die 25 are required to come into slight contact therewith in such an extent as not to roll out the metal plate material 21. Therefore, as shown by the arrows of FIG. 4(b), the part of the top 271 is drawn out, and the material of the top 271 moves to the sidewall 272. As a result, the top 271 is thinned to about 0.09 mm.

As shown in FIG. 5, in the second step, the metal plate material 21 having the initial protruding portion 27 is set on the die 28 of the second molding tool 24. In this state, the punch 29 approaches the die 28. Thereupon, as shown in FIG. 6(a), the top 271 of the initial protruding portion 27 is pressed toward the concave portions 281 and 292 of the die 28 and of the punch 29 by means of the convex portions 291 and 282 of the punch 29 and of the die 28. Therefore, the initial protruding portion 27 is further narrowed, and is drawn out. In this case, the amount of drawing-out of the metal plate material 21 from the flat state when the molding process starts is 40% or less, and is, preferably, 20% or less.

Thereafter, as shown in FIG. 6(b), the sidewall 272 of the initial protruding portion 27 is rolled out by the side wall surfaces of the convex portions 291 and 282 of the punch 29 and of the die 28 and by the side wall surfaces of the concave portions 281 and 292 of the die 28 and of the punch 29. Therefore, the thickness of the sidewall 272 becomes smaller to 0.08 mm, and the protruding portion 22 is molded. At this time, the top 271 of the protruding portion 27 is disposed between the convex portions 291, 282 and the concave portions 281, 292. In this state, the top 271 of the protruding portion 27 is in contact with the forward end surfaces of the convex portions 291 and 282 and in contact with the inner surfaces of the concave portions 281 and 292. However, a force by means of the convex portions 291, 282 and by means of the concave portions 281, 292 hardly acts on the top 271. Therefore, the thickness of the top 271 is not decreased.

Additionally, in this state, based on the rigidity of the metal plate material 21, spaces 276 and 275 are defined between the base end of the convex portion 291 or 282 and the metal plate material 21 and between the forward-end center of the convex portion 291 or 282 and the top 271 of the protruding portion 27, respectively. The spaces 275 and 276 are not necessarily required to be defined. In other words, although the punch 29 and the die 28 may be brought into contact with the entire surface of the metal plate material 21, the punch 29 and the die 28 are required to be brought into slight contact therewith in such an extent as not to deform the metal plate material 21. Additionally, when the thickness of the sidewall 272 is decreased by rolling-out, the material of the sidewall 272 moves to the top 271 of the protruding portion 22 as shown by the arrows of FIG. 6(b). As a result, the thickness of the top 271 that has been decreased by the narrowing process at the stage shown in FIG. 6(a) is compensated by the movement of the material from the sidewall 272. In this case, the movement of the material from the sidewall 272 to the top 271 is smoothly performed by the spaces 275 and 276. As shown by the arrows of FIG. 6(b), the material of the sidewall 272 of the initial protruding portion 27 moves to the top 271, and, as a result, the top 221 and the sidewall 222 of the protruding portion 22 are molded so that those thicknesses become uniform to be a little over 0.08 mm.

As described above, the protruding portions 22 are alternately formed in the metal plate material 21, and the metal plate material 21 is molded and thinned to a predetermined thickness. In the first step, thinning and molding are performed by drawing out the metal plate material 21. In the second step, thinning and molding are performed by the movement of the material resulting from rolling out the metal plate material 21.

As shown in FIG. 7, in the third step, the metal plate material 21 having the protruding portion 22 is set on the die 32 of the third molding tool 31. The punch 33 approaches the die 32 in this state. Thereupon, as shown in FIG. 8(a) and FIG. 8(b), the sidewall 222 of the protruding portion 22 is rolled out and is shaped to be erected by means of the side wall surfaces of the convex portions 331 and 322 of the punch 33 and of the die 32 and by means of the side wall surfaces of the concave portions 321 and 332 of the die 32 and of the punch 33. As a result, the inclination angle 93 of the sidewall 222 of the protruding portion 22 becomes small, and the top 221 of the protruding portion 22 is expanded in the width direction.

At this time, based on the rigidity of the metal plate material 21, spaces 276 and 275 are defined between the base end of the convex portion 331 or 322 and the metal plate material 21 and between the forward-end center of the convex portion 331 or 322 and the top 221 of the protruding portion 22, respectively. The spaces 275 and 276 are not necessarily required to be defined. In other words, although the punch 33 and the die 32 may be brought into contact with the entire surface of the metal plate material 21, the punch 33 and the die 32 are required to be brought into slight contact therewith in such an extent as not to deform the metal plate material 21. Additionally, when the thickness of the sidewall 222 is decreased by rolling out, the material of the sidewall 222 moves to the top 221 of the protruding portion 22. As a result, the thickness of the top 221 that has been decreased by expanding the top 221 in the width direction at the stage shown in FIG. 8(a) is compensated by the movement of the material from the sidewall 222. Therefore, the thickness of the top 221 does not become extremely small. Moreover, the possibility that the top 221 will be drawn out hardly exists. Therefore, the thickness of the protruding portion 22 is made uniform at 0.08 mm. In this case, the movement of the material from the sidewall 222 to the top 221 is smoothly performed by the spaces 275 and 276 in the same way as in the second step.

In the first to third steps, the arrangement pitch $\rho 2$ of the convex portion 291 and of the concave portion 292 in the punch 29 of the second molding tool 24 is narrower than the arrangement pitch $\rho 1$ of the convex portion 261 and of the concave portion 262 in the punch 26 of the first molding tool 23. Likewise, the arrangement pitch ρ2 of the concave portion 281 and of the convex portion 282 in the die 28 of the second molding tool 24 is narrower than the arrangement pitch ρ1 of the concave portion 251 and of the convex portion 252 in the die 25 of the first molding tool 23 (not shown).

In the second step, the sidewall 272 of the initial protruding portion 27 is rolled out by the second molding tool 24, and the material of the initial protruding portion 27 extends along the perimeter. However, the amount of extension of the initial protruding portion 27 is corrected by narrowing the arrangement pitch ρ2 of the concave portions 281, 292 and the convex portions 282, 291 of the die 28 and of the punch 29. In other words, in expectation of the amount of extension of the initial protruding portion 27 in the second step, the sidewall 272 of the initial protruding portion 27 is rolled out by the concave portions 281, 292 and the convex portions 282, 291 that have been reduced in arrangement pitch ρ2. As a result, the warpage or undulation of the protruding portion 22 is restrained.

The third molding tool 31 is used in the third step. The arrangement pitch ρ3 of the concave portions 321, 332 and the convex portions 322, 331 of the die 32 and of the punch 33 of the third molding tool 31 is wider than the arrangement pitch ρ2 of the concave portions 281, 292 and the convex portions 282, 291 of the die 28 and of the punch 29 of the second molding tool 24. The arrangement pitch ρ3 of the concave portions 321, 332 and the convex portions 322, 331 of the die 32 and of the punch 33 of the third molding tool 31 is narrower than the arrangement pitch ρ1 of the concave portions 251, 262 and the convex portions 252, 261 of the die 25 and of the punch 26 of the first molding tool 23.

In the third step, the sidewall 222 of the protruding portion 22 is shaped to be erected almost without being rolled out by means of the die 32 and the punch 33. Therefore, the material of the protruding portion 22 does not greatly extend along the perimeter. Therefore, it is possible to allow the final arrangement pitch of the protruding portion 22 to approximate the arrangement pitch ρ1 of the first molding tool 23 by setting the arrangement pitch ρ3 of the third molding tool 31 at a value between the arrangement pitch ρ2 of the second molding tool 24 and the arrangement pitch ρ1 of the first molding tool 23.

Therefore, according to this embodiment, it is possible to obtain the following effects.

(1) In the first step, the initial protruding portion 27 is formed in the metal plate material 21 by means of the first molding tool 23, and the top 271 of the initial protruding portion 27 is made thinner than the other parts. In the second and third steps, the sidewall 272 of the initial protruding portion 27 is rolled out by the second molding tool 24, and the protruding portion 22 is molded.

In the second and third steps, when the sidewall 272 of the initial protruding portion 27 is rolled out by the second and third molding tools 24 and 31, the material of the sidewall 272 moves to the top 271. The drawing-out molding of the protruding portion 22 of the metal plate material 21 is thus achieved by rolling-out except the molding of the initial protruding portion 27. In other words, the drawing-out molding is performed in the first step, and the rolling-out is performed in the other steps. Therefore, the ratio of the drawing-out molding becomes small, and therefore it is possible to prevent the metal plate material 21 from being broken. Therefore, it is possible to mold the metal plate material 21 without breaking it even if the protruding portion 22 is high or even if the width of the top 271 is great. A fuel cell separator produced so that the protruding portion 22 is higher and so that the width of the top 271 is greater is superior in a function to guide cooling water, gas, etc.

(2) The drawing-out molding of the metal plate material 21 is performed only in the first step. In the second step and subsequent to the second step, the metal plate material 21 is thinned by rolling out the metal plate material 21. Therefore, it is possible to prevent the metal plate material 21 from being broken. Moreover, in the first step, the metal plate material 21 is drawn out only 20% of its overall length. Additionally, in the rolling-out in the second step, the material is moved to a drawn-out part, and therefore it is possible to further prevent the metal plate material 21 from being broken. According to a conventional industrial method, the fraction defective caused by the occurrence of breaking, such as pinhole or crack, is 10 to 20%, and, according to the industrial method of this embodiment, the fraction defective has fallen to 0.02%.

(3) The material of the sidewall 272 that has been rolled out is supplied to the top 271 of the protruding portion 27 that has been drawn out. Therefore, it is possible to return the material of the top 271 that has been drawn out, and it is possible to mold the protruding portion 22 to have a uniform thickness. Therefore, the concentration of the stress is reduced, and the strength distribution and the stress distribution of a molded article are excellently balanced. Therefore, it is possible to improve the breaking strength, and the warpage or deformation of a molded article is restrained. Therefore, it is possible to produce a high-quality molded article.

(4) The plurality of protruding portions 22 are formed on both sides of the metal plate material 21 in a pleated shape. When this molded article is used as a fuel cell separator, it is possible to form gas-flow passages on both sides of the separator by means of the protruding portions 22.

(5) In the third step, the sidewall 222 of the protruding portion 22 is shaped to be erected by means of the third molding tool 31. When this molded article is used as a fuel cell separator, it is possible to expand the cross-sectional area of the gas-flow passages formed on the separator because the sidewall 222 of the protruding portion 22 is in an erected state.

(6) In the third step, the top 221 of the protruding portion 22 is expanded by the third molding tool 31. In this case, the top 221 of the protruding portion 22 is expanded, and therefore the junction area with other junction plates becomes great, and it is possible to improve the junction strength between separators. As a result, the surface pressure between a separator and a power generation member disposed inside the separator is dispersed. Therefore, it becomes difficult to break the power generation member. Additionally, the cross-sectional area of flow passages formed on the separator, which are used for gases, cooling water, etc., is expanded, and therefore power generation efficiency is also improved.

(7) The arrangement pitch ρ2 of the concave portions 281, 292 and the convex portions 282, 291 of the die 28 and of the punch 29 of the second molding tool 24 is narrower than the arrangement pitch ρ1 of the concave portions 251, 262 and the convex portions 252, 261 of the die 25 and of the punch 26 of the first molding tool 23. The arrangement pitch ρ2 of the second molding tool 24 is thus reduced, and this makes it possible to correct the extension along the perimeter of the material by rolling out the sidewall 272 in the second step. As a result, it is possible to restrain the warpage or undulation of a molded article.

(8) The arrangement pitch $\rho3$ of the concave portions 321, 332 and the convex portions 322, 331 of the die 32 and of the punch 33 of the third molding tool 31 is wider than the arrangement pitch $\rho2$ of the second molding tool 24, and is narrower than the arrangement pitch $\rho1$ of the concave portion 251, 262 and the convex portions 252, 261 of the die 25 and of the punch 26 of the first molding tool 23. Therefore, it is possible to mold the metal plate material 21 in expectation of the extension of the metal plate material 21 in the second step. Therefore, the dimensional accuracy of a product improves.

Second Embodiment

Next, a second embodiment of the present invention will be described with reference to FIG. 10 to FIG. 14. In the second embodiment, a detailed description of the same component as in the first embodiment is omitted.

Figure 10:
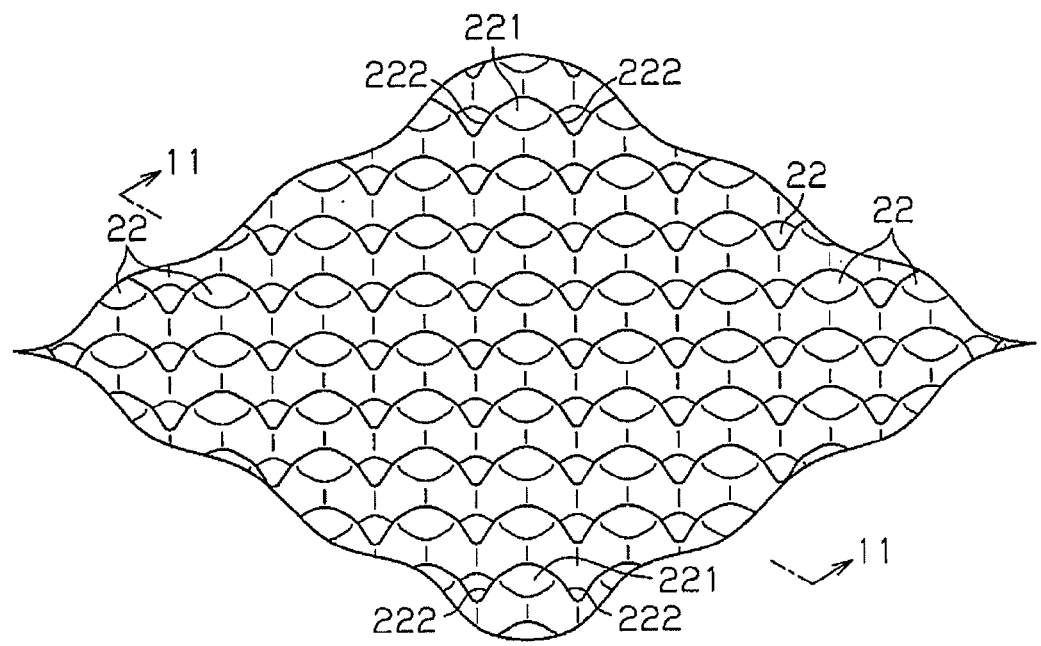
FIG. 10 is a perspective view showing a molded article that has been molded by a method for molding a metal plate material according to a second embodiment of the present invention.

As shown in FIG. 10, a plurality of protruding portions 22 are formed on both sides of the metal plate material 21 that is made into a fuel cell separator. The protruding portions 22 are formed in a dimpled shape and are evenly spaced out.

Figure 11:
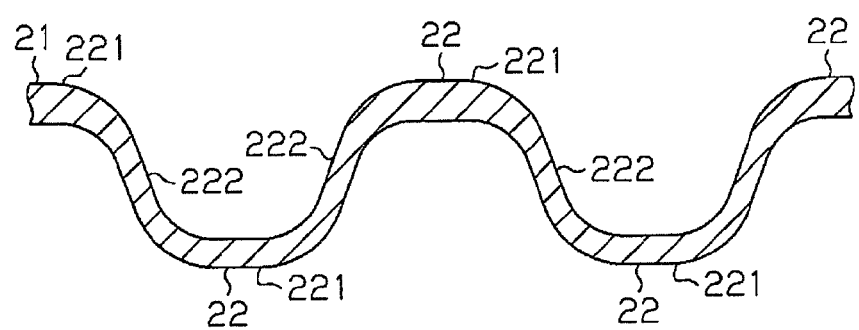
FIG. 11 is a partial cross-sectional view along line 11-11 of FIG. 10.

As shown in FIG. 11, each protruding portion 22 is composed of a top 221 and inclined sidewalls 222 continuous with the top 221. The cross section of the protruding portion 22 has a trapezoidal shape. The protruding portion 22 is molded substantially in the same way as in the first embodiment in order shown in FIG. 12 to FIG. 14. In other words, that is molded in order of a first step that uses the first molding tool 23, a second step that uses the second molding tool 24, and a third step that uses the third molding tool 31.

Figure 12:
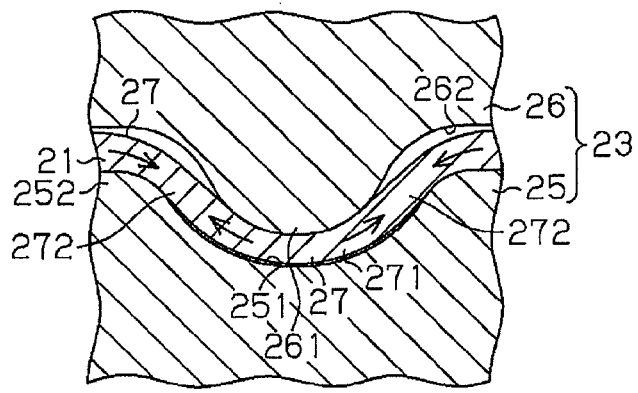
FIG. 12 is a partial cross-sectional view showing a first step of the molding method of the second embodiment.
Figure 13:
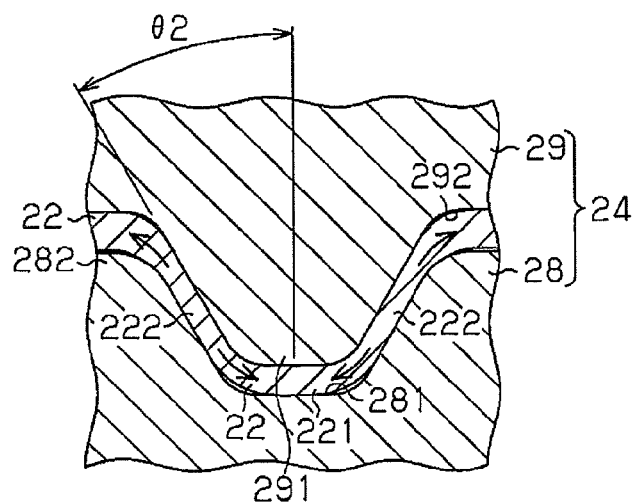
FIG. 13 is a partial cross-sectional view showing a second step of the molding method of the second embodiment.
Figure 14:
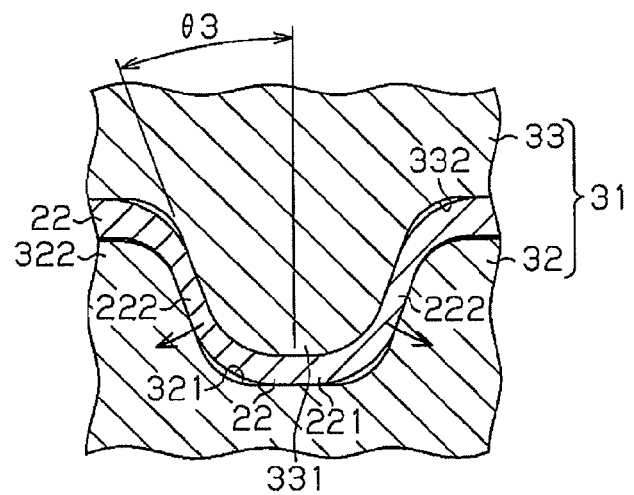
FIG. 14 is a partial cross-sectional view showing a third step of the molding method of the second embodiment.
Figure 15A:
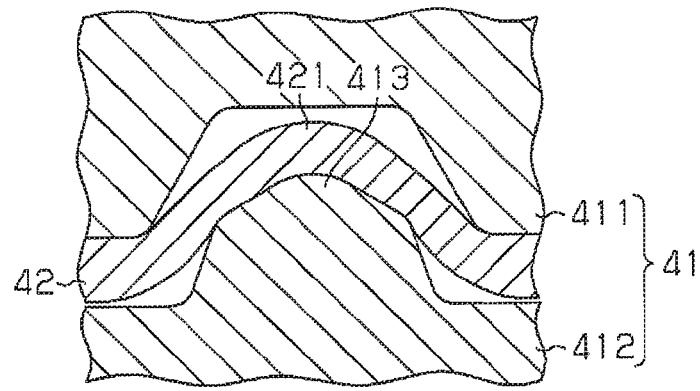
FIGS. 15 (a) to (c) are partial cross-sectional views that sequentially show a molding process of a conventional molding method.
Figure 15B:
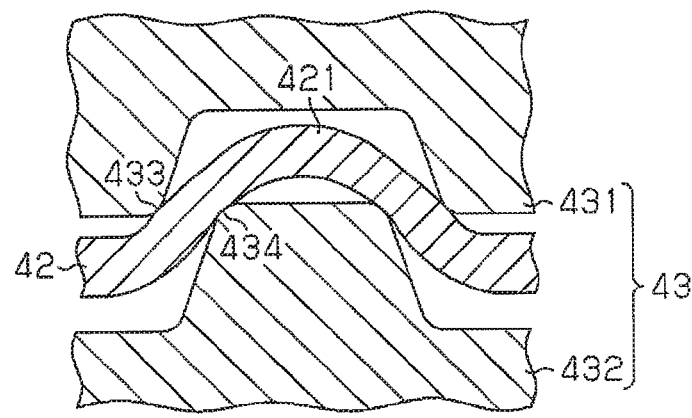
Figure 15C:
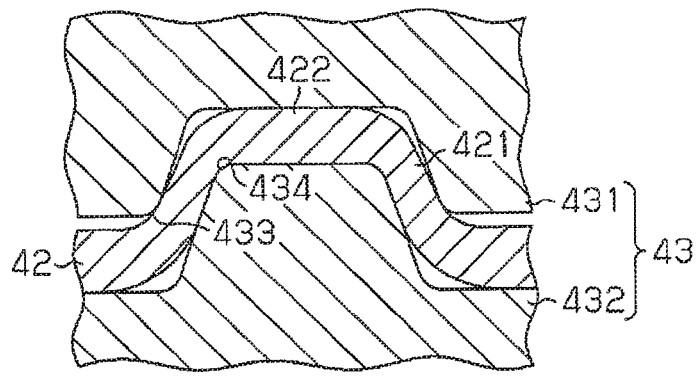
Figure 16A:
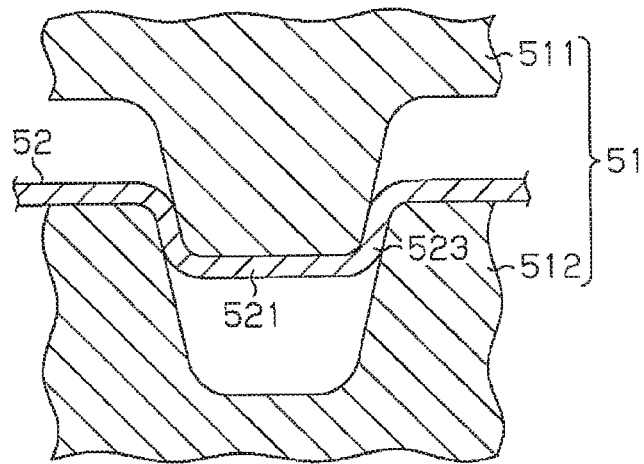
FIGS. 16 (a) to (c) are partial cross-sectional views that sequentially show a molding process of another conventional molding method.
Figure 16B:
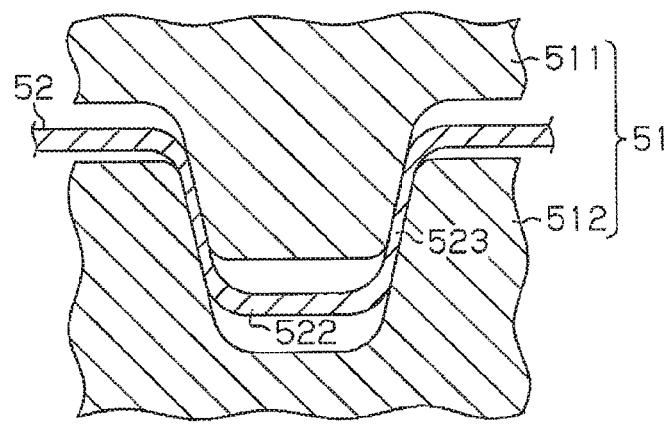
Figure 16C:
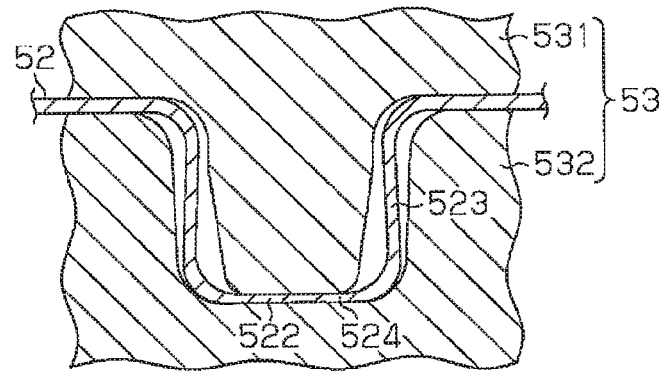

As shown in FIG. 12, in the first step, an initial protruding portion 27 is molded in the metal plate material 21 by means of the die 25 and the punch 26 of the first molding tool 23. As shown in FIG. 13, in the second step, the sidewall 272 of the initial protruding portion 27 is rolled out by the die 28 and the punch 29 of the second molding tool 24, and the protruding portion 22 is molded. As shown in FIG. 14, in the third step, the sidewall 222 of the protruding portion 22 is shaped to be erected by means of the die 32 and the punch 33 of the third molding tool 31.

Therefore, according to the second embodiment, it is possible to obtain the following effect in addition to the effects of the first embodiment.

(9) According to this molding method, the plurality of protruding portions 22 are formed on both sides of the metal plate material 21 in a dimpled shape. When this molded article is used as a fuel cell separator, it is possible to form gas-flow passages capable of diffusing the flow of gas, cooling water, etc., on the separator by means of the protruding portion 22.

Each embodiment mentioned above may be modified as follows.

The protruding portions 22 being in a pleated shape or in a dimpled shape may be formed on only one side of the metal plate material 21.

The protruding portions 22 being in a pleated shape or in a dimpled shape may be formed with uneven intervals on the metal plate material 21.

The metal plate material 21 may be employed for use in a heat dissipation plate.

After completing the third step, a fourth step or a further subsequent step may be performed. In the fourth step and the subsequent steps, the sidewall 222 of the protruding portion 22 may be further erected, or may have holes bored in predetermined positions.

Before the first step, another step may be provided. This other step may be, for example, a grinding step or a hole boring step.

The molding method of the first or second embodiment may be applied to a metal plate material having only a single protruding portion.

The protruding portion may be used for another purpose that differs from that of each embodiment mentioned above. For example, the protruding portion may be embodied as a projection that forms a seal portion with other adjoining members.

In the metal plate material, protruding portions formed in a pleated shape and protruding portions formed in a dimpled shape may be mixed together.

The punch and the die may be replaced with each other.

What is claimed is:

1. A method for molding a protruding portion in a metal plate material by a plurality of molding tools, each molding tool having a die and a punch, the method comprising:
   a first step of molding the protruding portion in the metal plate material by drawing-out molding that uses a first molding tool, the protruding portion being molded so that a top of the protruding portion is made thinner than other parts of the metal plate material being molded;
   a second step of rolling out sidewalls of the protruding portion molded in the first step by use of a second molding tool to extend the sidewalls by applying pressure to the sidewalls, the protruding portion being molded to have an arrangement pitch narrower than an arrangement pitch of the protruding portion formed in the first step, and
   a third step of shaping the sidewalls of the protruding portion molded in the second step to erect the sidewalls by use of a third molding tool, wherein
   the die and the punch of each of the first molding tool, the second molding tool and the third molding tool each include concave portions and convex portions for forming the protruding portion in the metal plate material,
   the concave portions and the convex portions of each of the first molding tool, the second molding tool and the third molding tool each have an arrangement pitch defined as a distance between one of adjacent concave portions or adjacent convex portions, respectively, and
   the arrangement pitch of the concave portions and the convex portions of the die and of the punch of the third molding tool is wider than the arrangement pitch of the concave portions and the convex portions of the die and of the punch of the second molding tool and is narrower than the arrangement pitch of the concave portions and the convex portions of the die and of the punch of the first molding tool.

2. The method for molding the metal plate material according to claim 1, wherein
   in the first step, an initial protruding portion is formed by pressing a top of a convex portion of the first molding tool toward the metal plate material and by molding the metal plate material while drawing out the metal plate material, and
   in the second step, the metal plate material is rolled out between side surfaces of the convex portion of the second molding tool.

3. The method for molding metal plate material according to claim 2, wherein
   in the first step, parts other than the top of the convex portion do not apply molding pressure to the metal plate material.

4. The method for molding the metal plate material according to claim 2, wherein
in the second step, parts other than inclined surfaces of the convex portion and other than both ends of the top of the convex portion do not apply molding pressure to the metal plate material.

5. The method for molding the metal plate material according to claim 1, wherein
in the third step, the top of the protruding portion is expanded by use of the third molding tool.

6. The method for molding the metal plate material according to claim 1, wherein
in the third step, parts other than inclined surfaces of the convex portions and other than both ends of the top of the convex portions do not apply molding pressure to the metal plate material.

7. The method for molding the metal plate material according to claim 1, wherein
a plurality of protruding portions are formed in the metal plate material in a pleated shape.

8. The method for molding the metal plate material according to claim 7, wherein
the protruding portions formed in the pleated shape are evenly spaced out.

9. The method for molding the metal plate material according to claim 1, wherein
protruding portions formed in a pleated shape are alternately formed on a front surface and a back surface of the metal plate material.

10. The method for molding the metal plate material according to claim 1, wherein
the protruding portions are formed in a dimpled shape.

11. The method for molding the metal plate material according to claim 1, wherein
the metal plate material is titanium.

12. A device for molding a protruding portion in a metal plate material by use of a plurality of molding tools, each molding tool having a die and a punch, wherein the plurality of molding tools includes a first molding tool, a second molding tool and a third molding tool,
the first molding tool has a die and a punch, both of which mold the protruding portion in the metal plate material,
the die and the punch of the first molding tool mold the protruding portion so that a top of the protruding portion becomes thinner than other parts of the metal plate material,
the second molding tool has a die and a punch, both of which roll out sidewalls of the protruding portion molded by the first molding tool to extend the sidewalls by applying pressure to the sidewalls,
the third molding tool has a die and a punch, both of which shape the sidewalls of the protruding portion to erect the sidewalls, wherein
the die and the punch of each of the first molding tool, the second molding tool and the third molding tool each include concave portions and convex portions for forming the protruding portion in the metal plate material,
the concave portions and the convex portions of each of the first molding tool, the second molding tool and the third molding tool each have an arrangement pitch defined as a distance between one of adjacent concave portions or adjacent convex portions, respectively,
the arrangement pitch of the concave portions and of the convex portions of the die and of the punch of the second molding tool is narrower than the arrangement pitch of the concave portions and of the convex portions of the die and of the punch of the first molding tool, and
the arrangement pitch of the concave portions and the convex portions of the die and of the punch of the third molding tool is wider than the arrangement pitch of the concave portions and the convex portions of the die and of the punch of the second molding tool and is narrower than the arrangement pitch of the concave portions and the convex portions of the die and of the punch of the first molding tool.

13. The device for molding the metal plate material according to claim 12, wherein
parts other than a top of the convex portions of the first molding tool do not apply molding pressure to the metal plate material.

14. The device for molding the metal plate material according to claim 12, wherein
parts other than inclined surfaces of the convex portions of the second molding tool and other than both ends of the top of the convex portions of the second molding tool do not apply molding pressure to the metal plate material.

15. The device for molding the metal plate material according to claim 12, wherein
the third molding tool expands the top of the protruding portion.

16. The device for molding the metal plate material according to claim 12, wherein
parts other than inclined surfaces of the convex portions of the third molding tool and other than both ends of the top of the convex portions of the third molding tool do not apply molding pressure to the metal plate material.

* * * * *